United States Patent
Krovats

(10) Patent No.: US 8,312,692 B2
(45) Date of Patent: *Nov. 20, 2012

(54) ROOF OBJECT SUPPORT SYSTEM

(75) Inventor: Neil Krovats, Winnipeg (CA)

(73) Assignee: Clearline Technologies Inc., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/984,999

(22) Filed: Jan. 5, 2011

(65) Prior Publication Data

US 2011/0113703 A1    May 19, 2011

Related U.S. Application Data

(63) Continuation of application No. 11/518,444, filed on Sep. 11, 2006, now Pat. No. 7,866,093, which is a continuation-in-part of application No. 10/703,479, filed on Nov. 10, 2003, now Pat. No. 7,168,210.

(51) Int. Cl.
*E04D 12/00* (2006.01)
*E04B 1/98* (2006.01)

(52) U.S. Cl. ............... 52/745.21; 52/745.2; 52/746.11; 52/41; 52/43; 52/57; 52/90.2; 52/575

(58) Field of Classification Search ............ 248/65–66, 248/49, 62, 74.1, 74.2, 55, 69, 68.1, 351, 248/500, 121; 52/24–26, 65–66, 68.1, 69, 52/503–505, 574–576, 698–715, 41–44, 52/57, 90.1–90.2, 167.1, 167.7–167.9, 351, 52/500, 74.2, 55, 62, 74.1
See application file for complete search history.

(56) References Cited

U.S. PATENT DOCUMENTS

| | | | | |
|---|---|---|---|---|
| 5,102,073 A * | 4/1992 | Lestenkof, Jr. | ............ | 248/49 |
| 5,217,191 A * | 6/1993 | Smith | ............ | 248/55 |
| 5,732,513 A * | 3/1998 | Alley | ............ | 52/25 |
| 6,364,256 B1 * | 4/2002 | Neider et al. | ............ | 248/55 |
| 6,502,791 B2 * | 1/2003 | Parker | ............ | 248/70 |
| 6,520,456 B1 * | 2/2003 | Neider et al. | ............ | 248/49 |
| 6,679,461 B1 * | 1/2004 | Hawkins | ............ | 248/74.2 |
| D521,851 S * | 5/2006 | Smart | ............ | D8/354 |
| 7,441,731 B2 * | 10/2008 | Smart et al. | ............ | 248/74.1 |
| 7,607,619 B2 * | 10/2009 | Smart et al. | ............ | 248/74.1 |
| 7,661,240 B2 * | 2/2010 | Sargent | ............ | 52/677 |
| 7,731,131 B2 * | 6/2010 | Trueb | ............ | 248/49 |
| 2003/0116683 A1 * | 6/2003 | Turner et al. | ............ | 248/65 |
| 2006/0091265 A1 * | 5/2006 | Smart | ............ | 248/49 |
| 2007/0045482 A1 * | 3/2007 | Smart | ............ | 248/68.1 |

* cited by examiner

*Primary Examiner* — Jeanette E. Chapman
(74) *Attorney, Agent, or Firm* — Ryan W. Dupuis; Kyle R. Satterthwaite; Ade & Company Inc.

(57) ABSTRACT

A support block for supporting objects on a roof is a molded elastomeric block with a substantially hollow core. The support block can be used as is or in a system whereby a galvanized steel channel is secured to the top wall of the block accommodating the mating of a variety of clamps. In some embodiments, the block is elongate and generally flat and supports a roof mounted object thereon when two or more blocks are supported parallel and spaced apart from one another with the object spanning between the blocks.

20 Claims, 7 Drawing Sheets

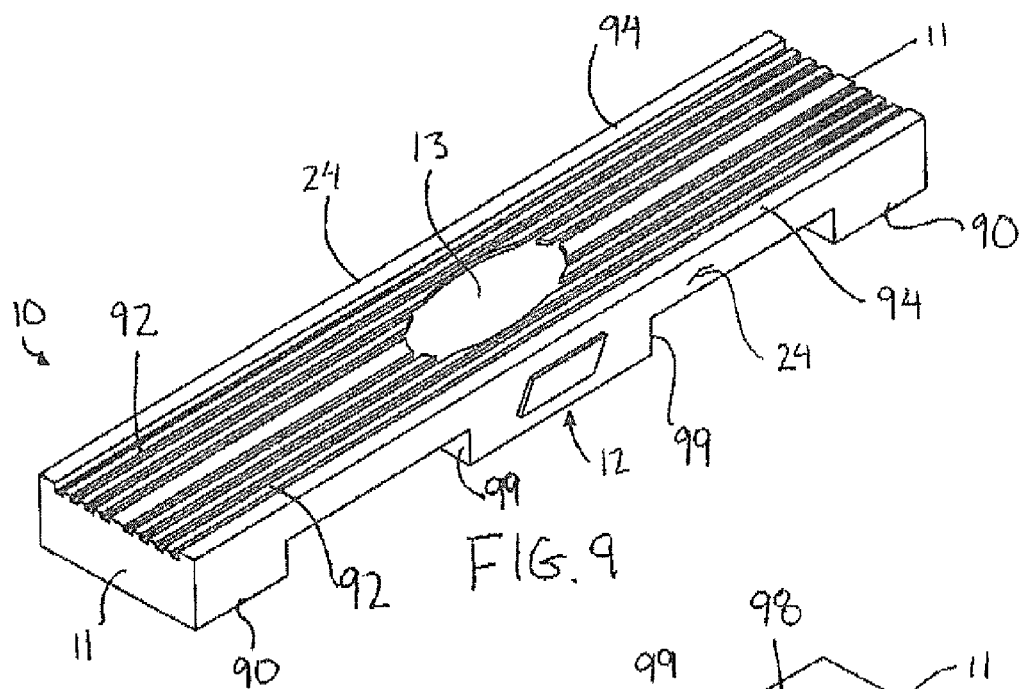
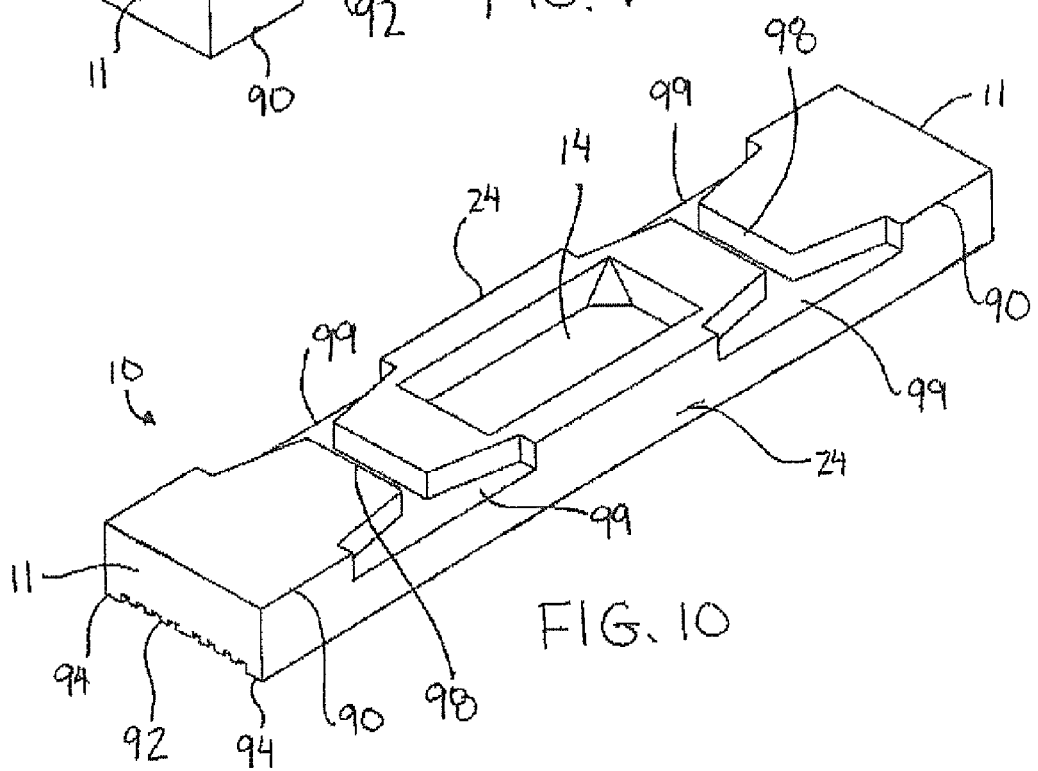

US 8,312,692 B2

ROOF OBJECT SUPPORT SYSTEM

This application is a continuation of U.S. parent application Ser. No. 11/518,444, filed Sep. 11, 2006 and issued under U.S. Pat. No. 7,866,093 which is a continuation-in-part of U.S. parent application Ser. No. 10/703,479, filed Nov. 10, 2003 and issued under U.S. Pat. No. 7,168,210.

FIELD OF THE INVENTION

The present invention relates to a vibration damping support system using blocks for supporting objects found on rooftops, for example pipes, walkways, HVAC equipment, various conduits and the like and for dampening vibration of the objects.

BACKGROUND

Various service units are found on the roofs of buildings, particularly commercial buildings. These service units will often have pipes and ductwork that snake along the rooftop. Furthermore, roof walkway systems are often present to facilitate access to the service units. These rooftop objects usually require supports to prevent damage to the roof surface.

The simplest support solution is the use of blocks of wood to support an object at intervals along its length. Although this simple support device has a number of drawbacks. A rooftop object being supported often vibrates causing vibrations to be transmitted through the block of wood. The result is excessive noise and movement of the block. It is conceivable that the block could move enough that it no longer supports the object it is intended to. Furthermore, this excessive movement may cause damage to the roof's surface requiring expensive repairs.

The wood blocks could be nailed to the roof but this could cause future leaks if not sealed properly. In any event, wood will deteriorate over time due to weathering and could possibly break loose.

Support systems according to the present invention are intended to mitigate these problems.

SUMMARY

According to one aspect of the present invention there is provided a support system in combination with a roof object on a roof, the support system comprising:

a support block having a flat bottom and a flat top;

the support block being formed as a single piece of a self-damping elastomeric material;

the support block being supported between the roof object and the roof such that the roof object is supported on the flat top of the support block and the elastomeric material forming the support block is arranged to dampen vibration between the roof object and the roof.

The support system is configured for supporting vibrating objects thereon, for example rooftop mechanical equipment for a building while protecting the roof from damage as a result of the vibration of the roof object. The elastomeric material reduces the transmission of vibrations from the supported object to the roof surface, thereby extending roof life. The hollow design enhances the vibration dampening qualities of the support block. Furthermore, the hollow design greatly reduces the shipping weight of the support blocks. Preferably, the support block is moulded as a single length from an elastomeric material, for example recycled tires. The single length can be cut into custom length units depending on the application. The support block is UV resistant to prevent photo-degradation. The use of recycled materials provides for an environmentally friendly method of manufacturing.

The block may be secured to the roof with adhesive in some applications.

The block may comprise hollow cavities formed in the flat bottom of the elastomeric material.

The elastomeric material may comprise recycled tires.

A mounting channel formed of rigid metal may be mounted to the flat top of the support block with the roof object being coupled to the mounting channel by a supporting bracket. Preferably, the channel is generally U-shaped in cross section, having a base secured to the flat top of the support block and a pair of spaced apart upright flanges spanning upward from the base to an open top end of the channel.

Preferably, the channel is made from galvanized steel to reduce the effects of weather corrosion. The terms "clamp" or "bracket" refer to a variety of different devices, for example pipe clamps, cable clamps, electrical fittings, saddles, spring bolts, beam clamps, roller clamps, and variable angle support legs.

When there are provided two support blocks, each formed of a single piece of self damping elastomeric material, a channel may be arranged to span between the two support blocks for interconnecting the blocks and supporting the roof object thereon.

In one embodiment, the block is elongate in a longitudinal direction in which the flat top and flat bottom are wider in a lateral direction than a height of the support block between the flat top and the flat bottom. Preferably width of the block in the lateral direction is plural times the height of the block and length of the block in the longitudinal direction is plural times a width of the block in the lateral direction.

The block may include through channels formed in the flat bottom of the block in communication between opposing sides of the block.

When the block is elongate in a longitudinal direction, the through channels preferably extend generally perpendicularly to the longitudinal direction between opposing sides of the block.

The through channels may include a pair of mouths at opposing sides of the block respectively which are wider in cross section than a main portion of the channel spanning between the mouths so that each mouth tapers inwardly from the respective side of the block to the main portion of the channel.

There may be provided a hollow cavity formed in the flat bottom of the elastomeric material between each adjacent pair of the channels.

The block may include a plurality of ribs of elastomeric material formed in the flat top of the support block which extend in the longitudinal direction of the support block.

The block may also include a pair of retainer lips protruding upwardly from the flat top and extending in the longitudinal direction along opposed side edges of the flat top. Preferably the retainer lips are wider in a lateral direction than the ribs and protrude upwardly from the flat top greater than the ribs.

The support block may include a pair of opposing solid end portions comprising continuous elastomeric material spanning between the flat top and the flat bottom of the block.

When two support blocks are used to commonly support a roof object, the support blocks are preferably spaced apart from one another beneath opposing sides of the roof object to commonly support the roof object spanning between the two support blocks.

According to another aspect of the present invention there is provided a support system for supporting objects providing vibration dampening, said system comprising:

at least two support blocks for supporting objects on a roof comprising a substantially hollow block of a self damping elastomeric material having a substantially flat bottom, two end walls perpendicular to the bottom, and a flat top wall; and a channel secured to the top wall of each of the least two support blocks interconnecting the at least two support blocks providing a platform for supporting objects.

This aspect of the present invention provides a superior vibration dampening sleeper support for large objects. For example, HVAC equipment, cable trays, roof walkway systems, and refrigeration equipment require supports to spread their weight over larger surface areas. The use of multiple interconnected support blocks provides an economical solution for supporting large objects.

BRIEF DESCRIPTION OF THE DRAWINGS

In the accompanying drawings, which illustrate exemplary embodiments of the present invention:

FIG. 9 is a perspective view of a second embodiment of the support block for use with the support system according to the present invention in which the top side of the block is illustrated.

FIG. 10 is a perspective view of a bottom side of the support block according to FIG. 9.

DETAILED DESCRIPTION

Figure 1:
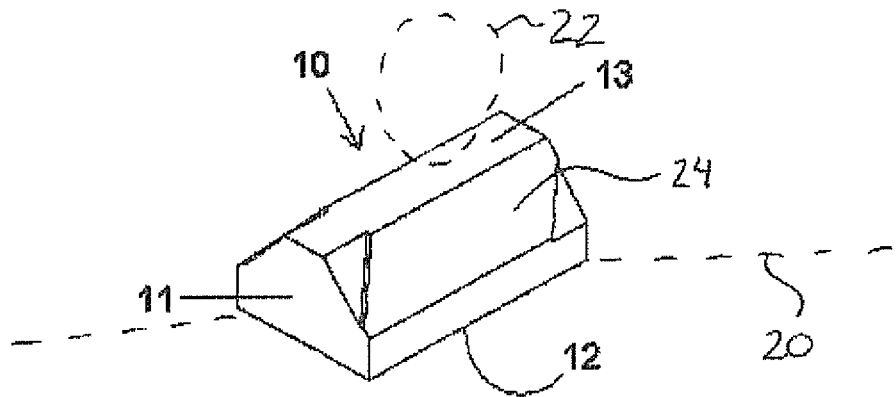
FIG. 1 is a perspective view of a support system illustrating a first embodiment of a support block.
Figure 2:
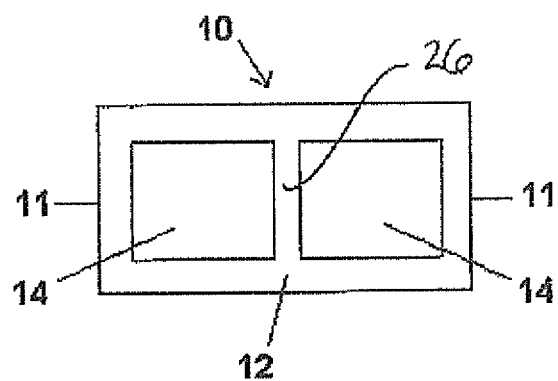
FIG. 2 is a bottom view of the support block according to FIG. 1.

Referring to the accompanying drawings, there is illustrated a support system generally indicated by reference number 5 comprising at least one support block 10. Although various embodiments are shown in the accompanying figures, the common features of each will first be described herein.

The block 10 is moulded from recycled tires. The support block has end walls 11 perpendicular to a flat bottom wall 12 and a flat top wall 13. The underside of the support block has hollowed out cavities 14.

The block is moulded into lengths and cut to a specifically sized unit according to the application. In use, the support block is placed on a roof 20 beneath a roof object 22, for example a pipe. The support device can be adhered to the roof surface if desired with polyurethane adhesives. The elastomeric construction of the support provides sound dampening of vibrating objects. In addition, the vibration dampening nature of the block prevents excessive wear to the roof.

In each instance, the support block is mounted between the roof object and the roof such that the roof object is supported on the flat top of the support block and the elastomeric material which forms the support block is arranged to dampen vibration between the roof object and the roof. Accordingly the support block of the support system is suitably arranged for supporting vibrating roof objects thereon, for example rooftop mechanical equipment for a building. The blocks 10 can be formed of recycled rubber in such a manner that the properties of the resulting elastomeric material are self dampening to optimize vibration dampening between the roof object and the roof.

As shown in FIGS. 1 through 8, a first embodiment of the support block 10 is shown. The support block 10 according to the first embodiment includes a flat top wall 13 which is elongate in a longitudinal direction of the block extending between the opposing end walls 11 of the block which are perpendicular to the longitudinal direction. The block further includes a pair of side walls 24 extending in the longitudinal direction between the end walls 11 which slope downwardly and laterally outwardly from the narrow top wall 13 to the flat bottom wall 12. The bottom wall 12 is much wider in the lateral direction than the top wall to provide lateral stability to the block. The hollow cavities 14 are open to the flat bottom wall 12 of the block and are suitably sized to occupy a major portion of the block so that a majority of the block is hollow. A divider wall 26 spans between the sloped side walls 24 and between the top wall and bottom wall of the block between adjacent cavities 14 to provide additional support to suspend the top wall above the hollow cavities 14.

As shown in FIGS. 3 through 8, the support system 5 includes a galvanized steel channel 31 secured to the top wall 13 of the support block of FIG. 1. In each instance the channel 31 is generally U-shaped in cross section, having a base 35 secured to the top wall and a pair of upright flanges 36 extending upwardly from opposing sides of the base to an open top end 37 of the channel. The base 35 is elongate in the longitudinal direction of the block and extends the full length of the top wall 13 between the end walls of the block. The upright flanges also extend in the longitudinal direction along opposing edges of the base to define sufficient space between the flanges for receiving suitable mounting brackets therebetween upon which the roof object can be supported.

Figure 3:
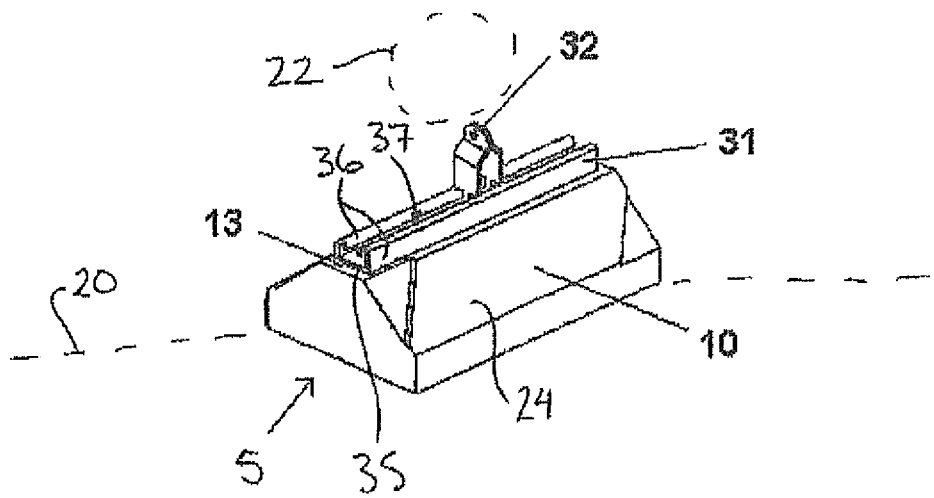
FIG. 3 is a perspective view of the support system using the block according to FIG. 1, shown with a galvanized steel channel secured to its top wall.

In FIG. 3, the channel 31 is secured directly to the top wall 13 with self-tapping screws (not shown). Pipe clamps 32 can be mounted to channel 31 so as to securely fasten a gas or refrigeration pipe to the support block.

Figure 4:
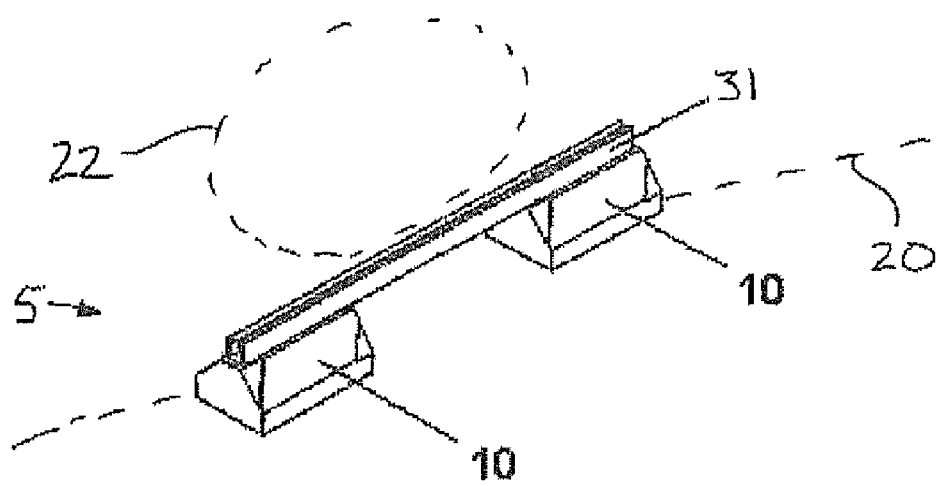
FIG. 4 is a perspective view of the support system using two support blocks according to FIG. 1 with an interconnecting galvanized steel channel.

In a further arrangement of the support system 5 as illustrated in FIG. 4, two spaced apart support blocks 10 have the galvanized steel channel 31 secured directly to the top wall of each support block with self-tapping screws (not shown) to span between and interconnect the blocks. This embodiment of the support device is sometimes referred to as a sleeper support. This superior vibration dampening sleeper can be used for supporting a variety of large rooftop objects, for example HVAC equipment, cable tray, roof walkway systems and refrigeration equipment.

Figure 5:
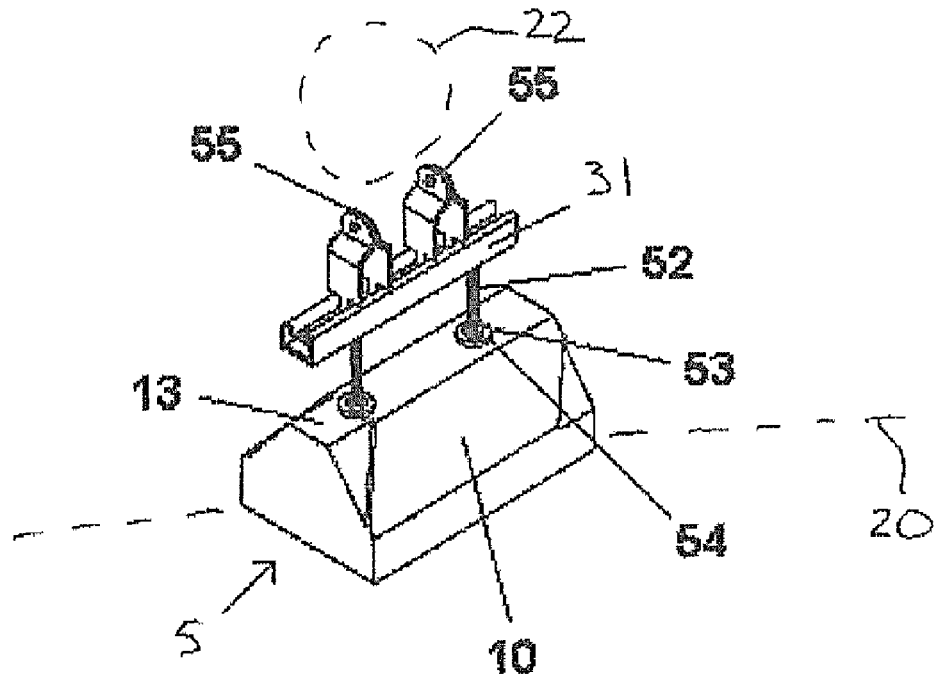
FIG. 5 is a perspective view of the support system using the block according to FIG. 1, shown with an extendable galvanized steel channel.

As shown in FIG. 5, in a further arrangement of the support system 5, the support block 10 has the galvanized steel channel 31 secured parallel to and spaced above the top wall 13 by threaded rods 52 spanning vertically between the channel and block. The rods are secured by suitable nuts 53 and washers 54. When securing the channel 31 to the block 10 in this manner, the channel can be raised or lowered to the desired position in relation to the block by turning the nuts mounted on the threaded rods. Pipe clamps 55 can be mated to channel 31 so as to securely fasten a gas or refrigeration pipe to the support block.

Figure 6:
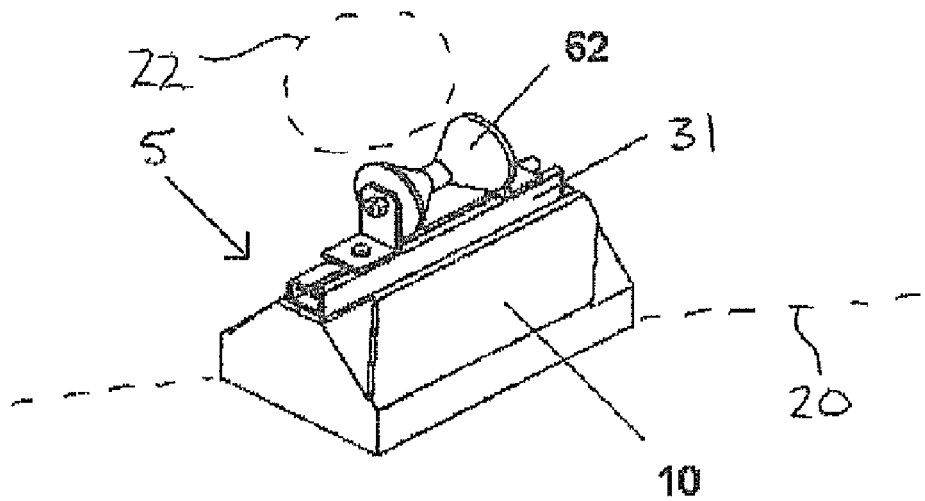
FIG. 6 is a perspective view of the support system using the block according to FIG. 1, shown with a roller support.

As shown in FIG. 6, in an alternative configuration, the support system 5 also has the galvanized steel channel 31 secured directly to the top wall 13 of the block with self-tapping screws (not shown). A galvanized steel roller clamp 62 may be secured to the galvanized steel channel 31 in which the roller clamp 62 includes a roller supported for rotation about a horizontal axis, parallel to the channel 31 and the top wall 13 of the block. The roller is shaped such that the end portions have a larger diameter than the middle portion to act as a cradle which centres a pipe thereon. The diameters and the degree of taper depend on the size of pipe to be supported.

Figure 7:
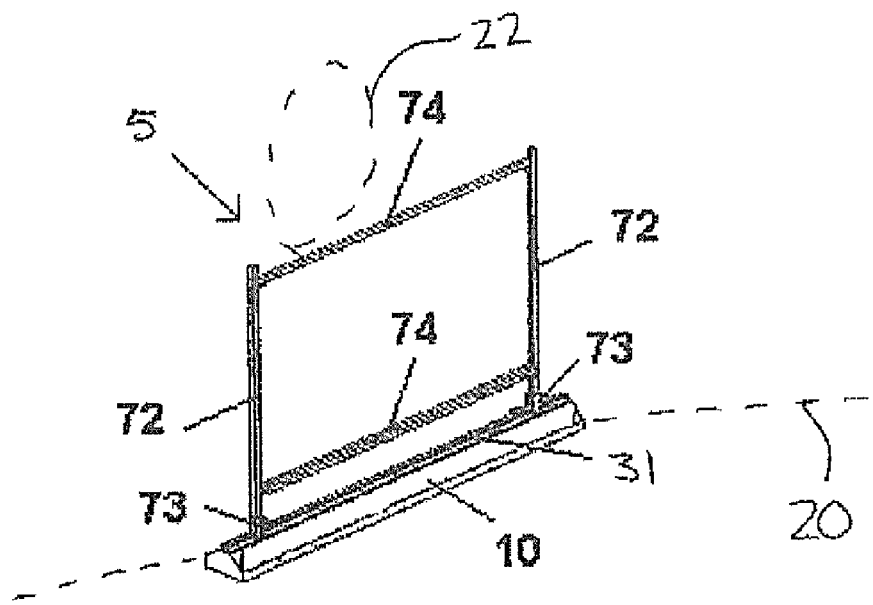
FIG. 7 is a perspective view of the support system using the block according to FIG. 1, shown with a galvanized steel strut.

As shown in FIG. 7, in a further arrangement, the support system 10 again has the galvanized steel channel 31 secured directly to the top wall 13 with self-tapping screws (not shown). In this instance, vertical steel struts 72 connect to channel 31 with the aid of fittings 73. The vertical steel struts 72 are spaced apart and joined adjacent top and bottom ends by cross-members 74 to provide rigidity to the rectangular support platform. This support device is particularly useful for supporting large rooftop ductwork.

Figure 8:
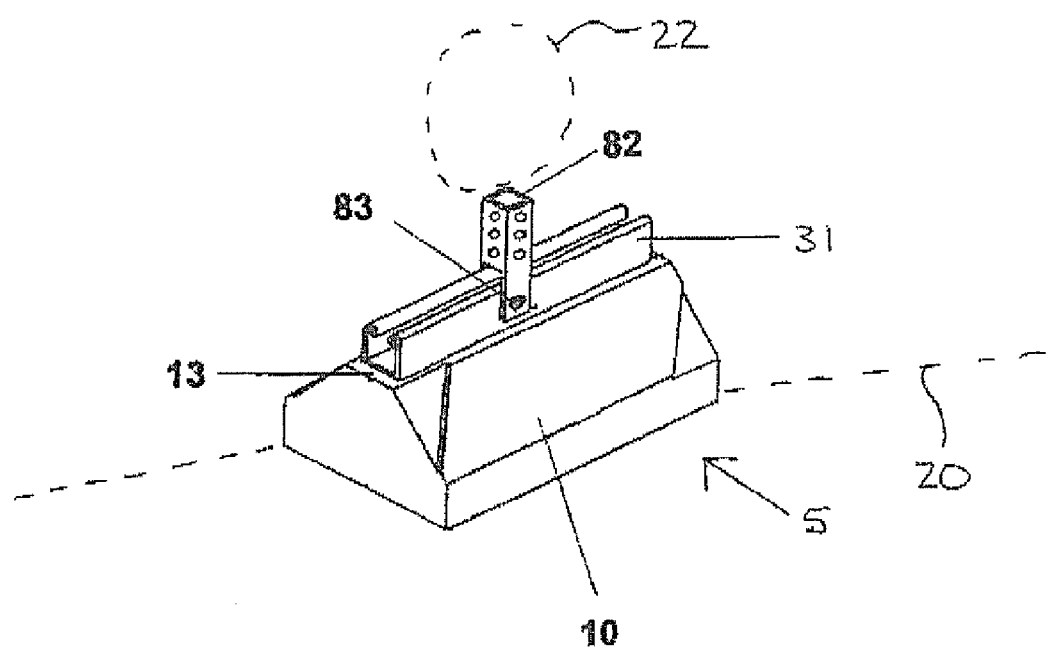
FIG. 8 is a perspective view of the support system using the block according to FIG. 1, shown with a variable angle support.

As shown in FIG. 8, the support block 10 again has a galvanized steel channel 31 secured directly to the top wall 13 with self-tapping screws (not shown). In this instance however, a variable angle support leg 82 is secured to the channel 31 by means of securing means 83, which securing means 83 may be a bolt (plated) and nut with locking washer. In use, the securing means 83 are loosened, the variable angle support leg 82 rotated into the desired position, and the securing means 83 tightened to retain the variable angle support leg 82 at the desired angle.

Turning now to FIGS. 9 through 14, a further embodiment of the support block 10 is illustrated in which the block is elongate in a longitudinal direction between the ends 11. The flat top 13 and flat bottom 12 have substantially identical rectangular dimensions with both lying perpendicular to vertical side walls 24 extending in the longitudinal direction between vertical end walls 11. Although the block 10 is shown in two different sizes in FIG. 9 and FIG. 13 respectively, in each instance the block 10 is plural times longer in the longitudinal direction between the opposing ends than the width in the lateral direction between opposing sides 24 while the width in the lateral direction between the opposing sides is also plural times a height of the block between the flat top and flat bottom. The blocks 10 according to FIGS. 9 through 14 include end portions 90 which are solid in construction having continuous elastomeric material between the flat top and flat bottom of the block.

Ribs 92 are formed in the flat top 13 of the block to form elongate protrusions projecting upwardly from the flat top and extending in the longitudinal direction parallel to one another and spaced laterally apart from one another. The ribs define grooves extending in the longitudinal direction between each adjacent pair of ribs. The ribs 92 are integrally formed of the elastomeric material with the block and assist in the vibration dampening properties of the block.

A retainer lip 94 is provided along the top wall 13 at each of the two sides 24 extending in the longitudinal direction. Each retainer lip 94 comprises a projection extending upwardly beyond the top wall 13 similarly to the ribs 92, but having dimensions which are wider in the lateral direction than individual ribs, as well as being taller in a vertical direction relative to the ribs so that the lips 94 project upwardly from the top wall greater than the ribs. By arranging the retainer lips to project upwardly from the top wall beyond the ribs 92, the retainer lips function to retain feet 96 of a roof object 22 on the top wall 13 of the blocks between the sides 24 thereof.

The blocks 10 according to FIGS. 9 through 14 also include flow channels 98 formed in the flat bottom 12 of the block. Each channel comprises a through channel extending in the lateral direction, perpendicularly to the longitudinal direction of the block so as to communicate between opposing longitudinally extending sides 24 of the block. Each channel 98 includes a main portion communicating between a pair of mouths 99 situated at the sides 24 of the block respectively so that each channel main portion spans and communicates between a respective pair of mouths 94 which are larger in cross sectional dimensions than the channel. The mouths 94 taper from the respective side 24 at an outer end, inwardly toward a main portion of the channel 98 of less cross sectional dimension so that the mouths each function to gather water collected at the sides 24 of the block and redirect the flow of water through the respective channels 98. In this configuration the flow channels 98 do not impede the flow of water across a roof so that water is not permitted to gather at sides of the block and potentially cause a leak in the roof. The hollow cavities 14 are provided in the flat bottom 12 of the block between each adjacent pair of channels 98.

Figure 13:
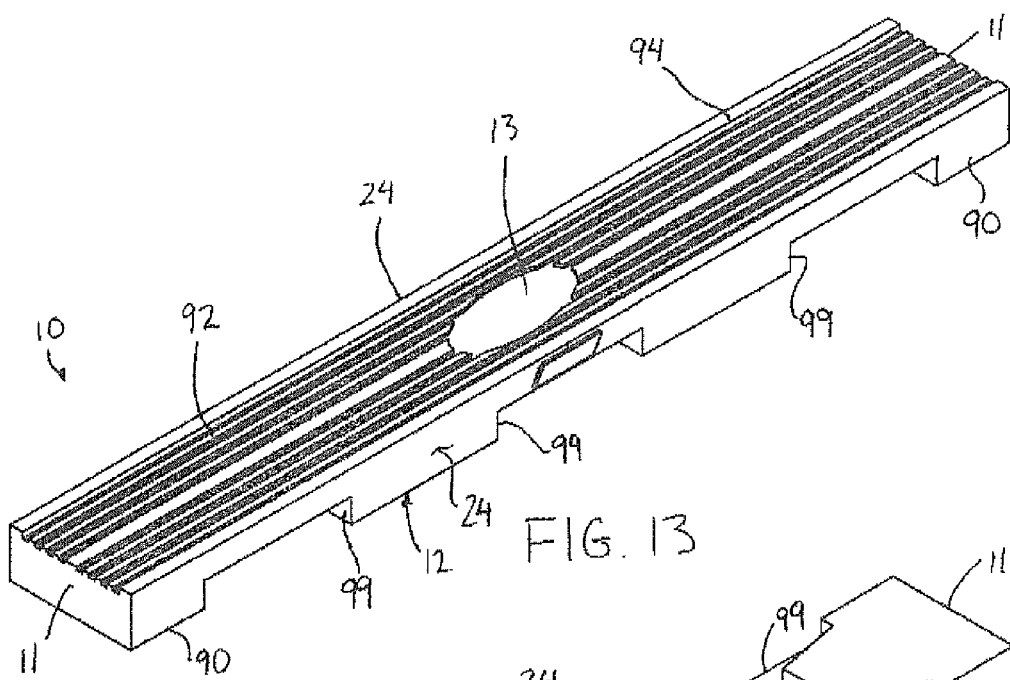
FIG. 13 is a perspective view of a further embodiment of the support block for use with the support system according to the present invention in which the top side of the block is illustrated.
Figure 14:
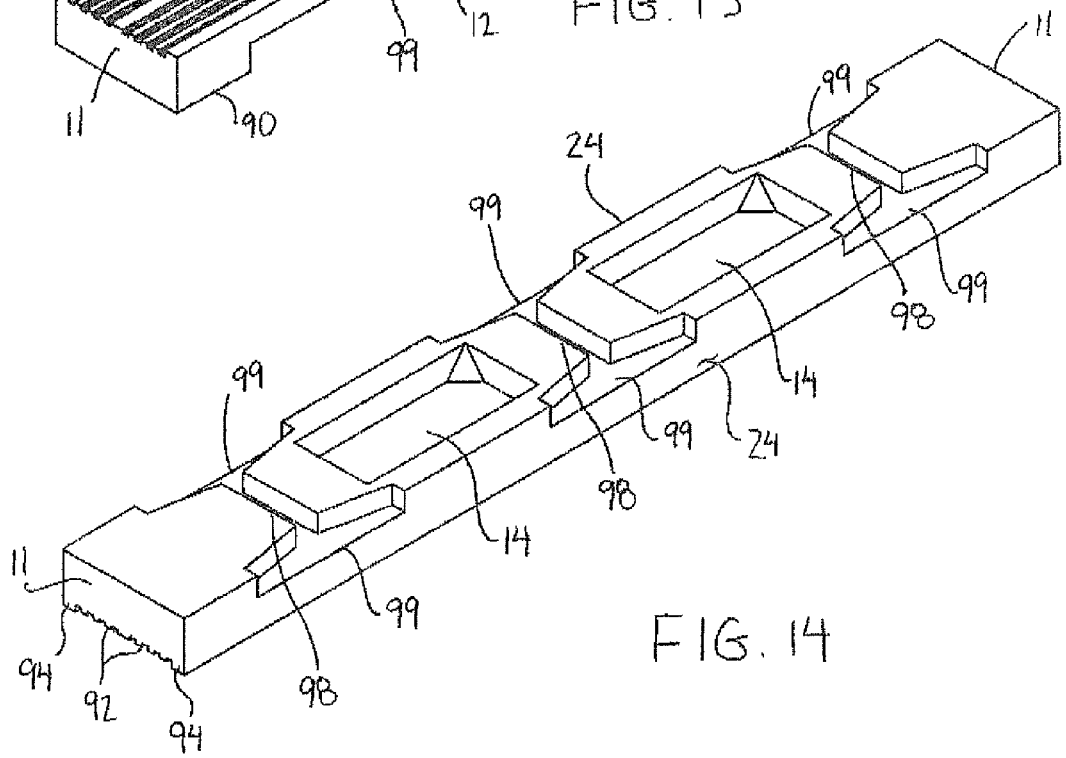
FIG. 14 is a perspective view of a bottom side of the support block according to FIG. 13.

In the embodiment of FIG. 9, the overall block is shorter in length than the block according to FIG. 13 and accordingly only two flow channels 98 are provided for locating a single cavity 14 therebetween. When the block 20 is longer as shown in FIG. 13, three through channel 98 are provided for locating two cavities 14 therebetween. In each instance the flow channels 98 are evenly spaced from one another along the longitudinal direction of the block.

Figure 12:
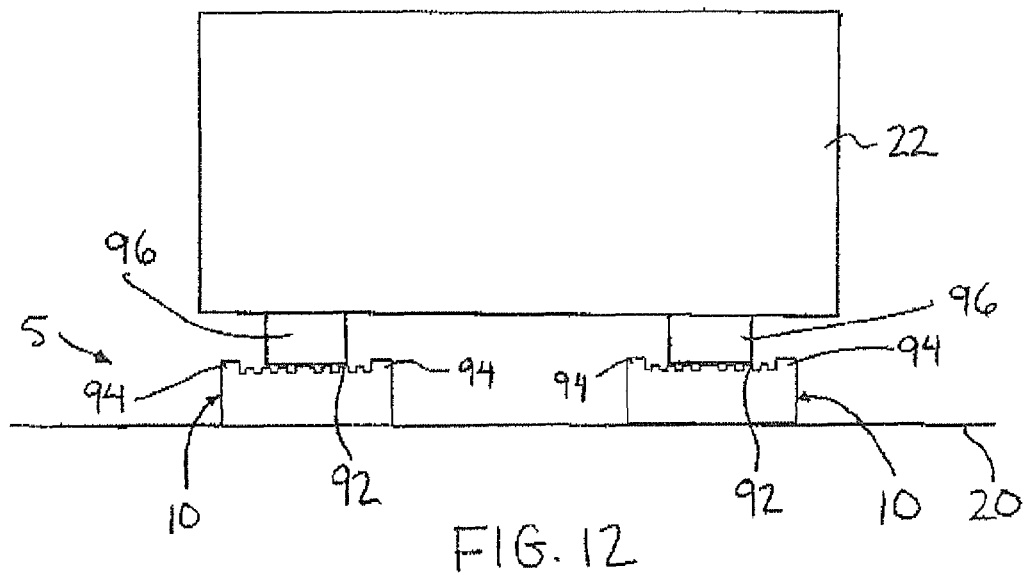
FIG. 12 is an end elevational view of the support system using two support blocks according to FIG. 9 to commonly support a roof object thereon.
Figure 11:
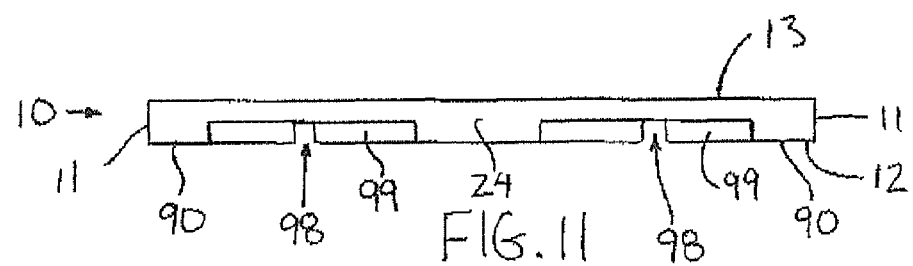
FIG. 11 is a side elevational view of the support block according to FIG. 9.

As shown in FIG. 12, the elongate shape of the blocks 10 according to FIGS. 9 through 14 readily permit the blocks to be used in pairs mounted spaced apart and parallel to one another at an adjustable spacing so that the resulting support system 5 defined by the pair of blocks can accommodate various dimensions of roof objects by simply locating the blocks 10 at varied spacing relative to one another. As shown in the example of FIG. 12, the support system 5 is arranged so that one of the support blocks 10 is provided along each opposing side of the roof object 22 supported commonly on the pair of blocks 10.

While specific embodiments of the present invention have been described in the foregoing, it is to be understood that other embodiments are possible within the scope of the invention. For example, some applications may require enhanced vibration dampening. In this case, the support blocks could be moulded from a material of reduced rigidity or be moulded from materials to create layers of differing rigidity within the block. The invention is to be considered limited solely by the scope of the appended claims.

The invention claimed is:

1. A method of forming a support block, the method comprising:
   providing a flat bottom arranged to be supported on the roof;
   providing a pair of opposing end walls oriented transversely to the flat bottom of the support block;
   providing a top wall which is flat and elongate in a longitudinal direction extending between the opposing end walls and which is arranged to support the roof object thereon;
   providing a pair of sloped side walls extending in the longitudinal direction of the top wall between the opposing end walls and extending downwardly and outwardly in a lateral direction from the top wall towards the flat bottom of the support block such that the flat bottom is wider in the lateral direction than the top wall;
   forming the flat bottom, the pair of opposing end walls, the top wall, and the pair of sloped side walls of resilient material; and
   providing at least one hollow cavity in the resilient material which is only open to the flat bottom such that the support block is arranged to be positioned between a roof object and a roof and the resilient material forming the support block is arranged to dampen vibration between the roof object and the roof.

2. The method according to claim 1 including forming the flat bottom, the pair of opposing end walls, the top wall, and the pair of sloped side walls from into a single piece of self-damping elastomeric material.

3. The method according to claim 1 including orienting the end walls perpendicularly to the flat bottom.

4. The method according to claim 1 including forming the support block using recycled rubber from tires.

5. The method according to claim 1 including forming the side walls and the end walls to be monolithic such that the side walls and end walls are without openings.

6. The method according to claim 1 including forming said at least one hollow cavity to comprise a pair of hollow cavities and forming a divider wall spanning between the top wall and the flat bottom between the hollow cavities such that the divider wall supports and suspends the top wall above the hollow cavities.

7. The method according to claim 1 including:
   providing a rigid channel member; and
   fastening the rigid channel member onto a top surface of the top wall of the support block such that the roof object is arranged to be supported on the rigid channel member.

8. The method according to claim 7 including mounting the rigid channel member against the top wall using threaded fasteners.

9. The method according to claim 7 including forming the rigid channel member to be generally U-shaped in cross section, having a base fastened to a top surface of the top wall of the support block and a pair of spaced apart upright flanges spanning upward from the base to an open top end of the channel.

10. The method according to claim 1 including molding a plurality of support blocks as a single length and cutting the support blocks from the single length.

11. A method of supporting a roof object comprising rooftop equipment on a roof of a building, the method comprising:
   providing a support block formed of a resilient material comprising:
      a flat bottom;
      a pair of opposing end walls oriented transversely to the flat bottom of the support block;
      a top wall which is flat and elongate in a longitudinal direction extending between the opposing end walls;
      a pair of sloped side walls extending in the longitudinal direction of the top wall between the opposing end walls and extending downwardly and outwardly in a lateral direction from the top wall towards the flat bottom of the support block such that the flat bottom is wider in the lateral direction than the top wall; and
      at least one hollow cavity formed in the resilient material so as to be only open to the flat bottom;
   providing a rigid channel member fastened onto a top of the flat top wall of the support block formed of the resilient material;
   supporting the flat bottom of the support block on the roof; and
   supporting the roof object such that the support block is positioned between the roof object and the roof and the resilient material forming the support block dampens vibration between the roof object and the roof.

12. A support block for supporting a roof object comprising rooftop equipment on a roof of a building, the support block comprising:
   a flat bottom arranged to be supported on the roof;
   a pair of opposing end walls oriented transversely to the flat bottom of the support block;
   a top wall which is flat and elongate in a longitudinal direction extending between the opposing end walls;
   a pair of sloped side walls extending in the longitudinal direction of the top wall between the opposing end walls and extending downwardly and outwardly in a lateral direction from the top wall towards the flat bottom of the support block such that the flat bottom is wider in the lateral direction than the top wall;
   the flat bottom, the pair of opposing end walls, the top wall, and the pair of sloped side walls being formed of resilient material; and
   at least one hollow cavity in the resilient material which is only open to the flat bottom such that the resilient material of the support block is arranged to be positioned between the roof object and the roof and such that the resilient material is arranged to dampen vibration between the roof object and the roof.

13. The support block according to claim 12 wherein the flat bottom, the pair of opposing end walls, the top wall, and the pair of sloped side walls are formed into a single piece of self-damping elastomeric material.

14. The method according to claim 12 wherein the end walls are oriented perpendicularly to the flat bottom.

15. The support block according to claim 12 wherein the flat bottom, the pair of opposing end walls, the top wall, and the pair of sloped side walls of the support block are comprised of recycled rubber tires.

16. The support block according to claim 12 wherein said at least one hollow cavity comprises a pair of hollow cavities and wherein the support block further comprises a divider wall spanning between the top wall and the flat bottom between the hollow cavities such that the divider wall is arranged to support and suspend the top wall above the hollow cavities.

17. The support block according to claim 12 further comprising a rigid channel member fastened onto a top surface of the top wall of the support block so as to be arranged to support the roof object on the rigid channel member.

18. The support block according to claim 12 wherein the side walls and the end walls are monolithic such that the side walls and the end walls are without openings.

19. The support block according to claim 17 wherein the rigid channel member is fastened to the top wall of the support block by threaded fasteners.

20. The support block according to claim 17 wherein the rigid channel member is U-shaped in cross section, having a base secured to the top wall of the support block and a pair of spaced apart upright flanges spanning upward from the base to an open top end of the channel.

* * * * *

UNITED STATES PATENT AND TRADEMARK OFFICE
CERTIFICATE OF CORRECTION

PATENT NO. : 8,312,692 B2
APPLICATION NO. : 12/984999
DATED : November 20, 2012
INVENTOR(S) : Neil Krovats It is certified that error appears in the above-identified patent and that said Letters Patent is hereby corrected as shown below:

Column 7, line 29, delete "from" between "walls" and "into";
Column 8, line 48, "method" should be "support block".

Signed and Sealed this
Twenty-sixth Day of February, 2013

Teresa Stanek Rea
*Acting Director of the United States Patent and Trademark Office*